United States Patent
Tate (10) Patent No.: US 9,795,123 B2
(45) Date of Patent: Oct. 24, 2017

(54) FISHING ROD (71) Applicant: Trent S. Tate, Austin, TX (US)

(72) Inventor: Trent S. Tate, Austin, TX (US)

(*) Notice: Subject to any disclaimer, the term of this patent is extended or adjusted under 35 U.S.C. 154(b) by 61 days.

(21) Appl. No.: 14/509,764

(22) Filed: Oct. 8, 2014

(65) Prior Publication Data
US 2015/0128475 A1 May 14, 2015

Related U.S. Application Data (60) Provisional application No. 61/902,633, filed on Nov. 11, 2013.

(51) Int. Cl.
A01K 87/00 (2006.01)
B32B 37/14 (2006.01)
B32B 37/18 (2006.01)
B32B 38/04 (2006.01)
A01K 87/04 (2006.01)
(Continued)

(52) U.S. Cl.
CPC .............. *A01K 87/04* (2013.01); *A01K 87/00* (2013.01); *A01K 87/06* (2013.01); *A01K 87/08* (2013.01); *B29C 47/06* (2013.01); *B29C 70/086* (2013.01); *B29C 70/30* (2013.01); *B29D 99/0046* (2013.01); *B29C 47/0021* (2013.01); *B29K 2101/12* (2013.01); *B29K 2105/06* (2013.01); *B29L 2031/772* (2013.01); *B32B 37/12* (2013.01); *B32B 37/153* (2013.01); *B32B 38/0004* (2013.01); *B32B 2305/022* (2013.01); *B32B 2307/72* (2013.01);
(Continued)

(58) Field of Classification Search
None
See application file for complete search history.

(56) References Cited

U.S. PATENT DOCUMENTS 330,572 A * 11/1885 Edwards ................ A01K 87/00
144/333
476,370 A * 6/1892 Divine ................... A01K 87/00
144/333
(Continued)

FOREIGN PATENT DOCUMENTS

DE 4101151 A1 7/1992
GB 0444803 A * 3/1936 ............. A01K 87/00

OTHER PUBLICATIONS

PCT Search Report and Written Opinion, Feb. 24, 2015; PCT Application No. PCT/US2014/060672.
(Continued)

*Primary Examiner* — Linda L Gray
(74) *Attorney, Agent, or Firm* — H. Artoush Ohanian, Esq.

(57) ABSTRACT

A fishing rod that includes an elongated, tapered rod blank at least a portion of which is quadrilateral in cross section, the quadrilateral portion of the rod blank diminishing in cross-sectional area toward a tip end of the rod blank, the quadrilateral portion of the rod blank comprising a sandwich-structured composite of a core disposed between facings, the core less dense than the facings, the quadrilateral portion of rod blank less stiff in a casting direction than transverse to the casting direction; fishing line guides mounted at intervals along the length of the rod blank; a reel seat mounted at the base end of the rod blank; and a handle mounted at the base end of the rod blank adjacent to the reel seat.

13 Claims, 9 Drawing Sheets

(51) Int. Cl.
  *A01K 87/06* (2006.01)
  *A01K 87/08* (2006.01)
  *B29C 47/06* (2006.01)
  *B29D 99/00* (2010.01)
  *B29C 70/08* (2006.01)
  *B29C 70/30* (2006.01)
  *B29K 101/12* (2006.01)
  *B29K 105/06* (2006.01)
  *B29L 31/00* (2006.01)
  *B32B 38/00* (2006.01)
  *B32B 37/12* (2006.01)
  *B32B 37/15* (2006.01)
  *B29C 47/00* (2006.01)

(52) U.S. Cl.
  CPC .... *Y10T 156/1052* (2015.01); *Y10T 156/1062* (2015.01); *Y10T 156/1761* (2015.01); *Y10T 156/1798* (2015.01)

(56) References Cited

U.S. PATENT DOCUMENTS

| | | | |
|---|---|---|---|
| 592,613 A * | 10/1897 | Kenyon | A01K 87/00 43/18.1 R |
| 638,733 A * | 12/1899 | Martin | A01K 87/00 254/395 |
| 767,982 A * | 8/1904 | Francia | H04L 27/2647 375/316 |
| 1,239,356 A | 9/1917 | Cochrane et al. | |
| 1,593,957 A * | 7/1926 | Shaver | A01K 87/00 43/18.1 R |
| 1,961,642 A * | 6/1934 | Pirnie | A01K 87/00 43/18.1 CT |
| 2,104,494 A | 1/1938 | O'brien, Jr. | |
| 2,341,053 A | 2/1944 | Mason | |
| 2,364,849 A | 12/1944 | Ibbotson et al. | |
| 2,477,800 A | 8/1949 | Harvey | |
| 2,537,488 A | 1/1951 | Stoner | |
| 2,571,717 A | 10/1951 | Howald et al. | |
| 2,613,660 A | 10/1952 | Bear | |
| 2,665,678 A | 1/1954 | Bear | |
| 2,749,643 A | 6/1956 | Scott | |
| 2,815,015 A | 12/1957 | Giacomo | |
| 3,401,482 A | 9/1968 | Burns | |
| 4,061,806 A | 12/1977 | Lindler et al. | |
| 4,214,395 A | 7/1980 | Caldwell, Jr. | |
| 4,422,259 A | 12/1983 | Shimano | |
| 4,582,758 A | 4/1986 | Bruce et al. | |
| 4,686,787 A | 8/1987 | Whipp | |
| 4,885,865 A | 12/1989 | Rumbaugh | |
| 4,962,608 A | 10/1990 | Loomis et al. | |
| 6,145,237 A | 11/2000 | Young | |
| 6,286,244 B1 | 9/2001 | Weiss | |
| 7,584,571 B2 | 9/2009 | Ryan | |
| 8,012,397 B2 | 9/2011 | Loke | |
| 8,281,513 B2 | 10/2012 | Underwood | |
| 2002/0092225 A1 | 7/2002 | Watanabe | |
| 2011/0031720 A1* | 2/2011 | Meyer | A63C 5/003 280/610 |
| 2011/0254242 A1 | 10/2011 | Eismann et al. | |

OTHER PUBLICATIONS

Words to Avoid When Critiquing Fly Rods, John Juracek, Nov. 18, 2012 (http://www.johnjuracek.com/2012/11/18/words-i-dislike-in-fly-rod-reviews/).

* cited by examiner

FISHING ROD

CROSS-REFERENCE TO RELATED APPLICATION

This patent application claims the benefit and priority of U.S. Provisional Patent Application No. 61/902,633, filed Nov. 11, 2013, and entitled "Flexible Flat Fishing Rod."

DETAILED DESCRIPTION OF EXAMPLE EMBODIMENTS

Figure 1:
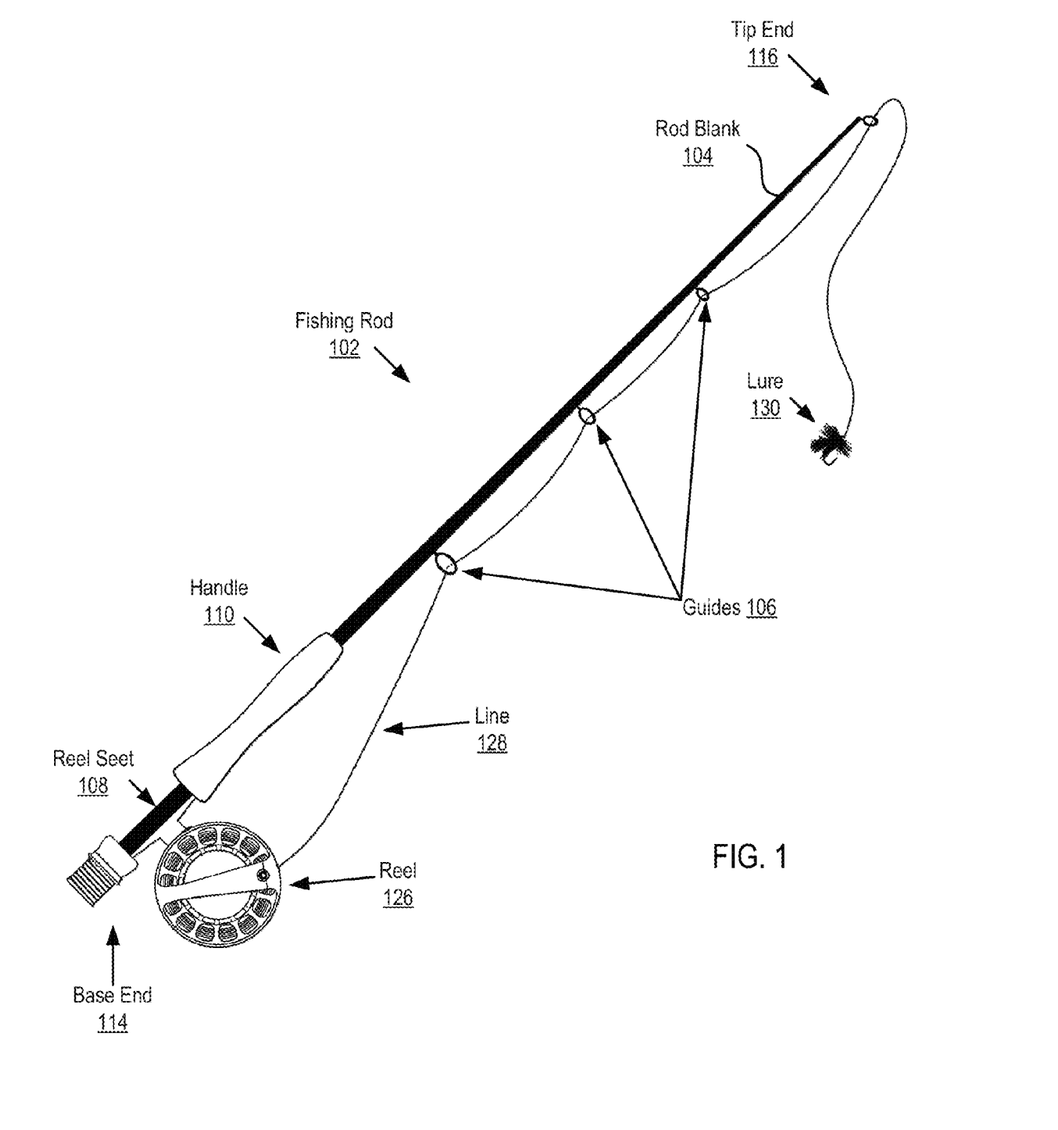
FIG. 1 sets forth a line drawing of a side view of an example fishing rod.

Example fishing rods, structures of fishing rods, and methods of making fishing rods according to embodiments of the present invention are described with reference to the accompanying drawings, beginning with FIG. 1. FIG. 1 sets forth a line drawing of a side view of an example fishing rod according to embodiments of the present invention that includes an elongated, tapered rod blank, fishing line guides mounted at intervals along the length of the rod blank, a reel seat mounted at the base end of the rod blank, and a handle mounted at the base end of the rod blank adjacent to the reel seat. As described in more detail below, the rod blank is quadrilateral in cross section, and the rod blank diminishes in cross-sectional area from the base toward the tip of the rod blank. The rod blank is composed, at least in part, of a sandwich-structured composite of a core disposed between facings, with the core less dense than the facings, and with the core and the facings configured so that the rod blank is less stiff in the casting direction than it is in any direction transverse to the casting direction. The fishing rod itself may be implemented as a fly rod, a spincast rod, a baitcast rod, a trolling rod, a Tenkara rod, a surf rod, an ice rod, a deep sea rod, a telescopic rod, or the like.

Figure 2A:
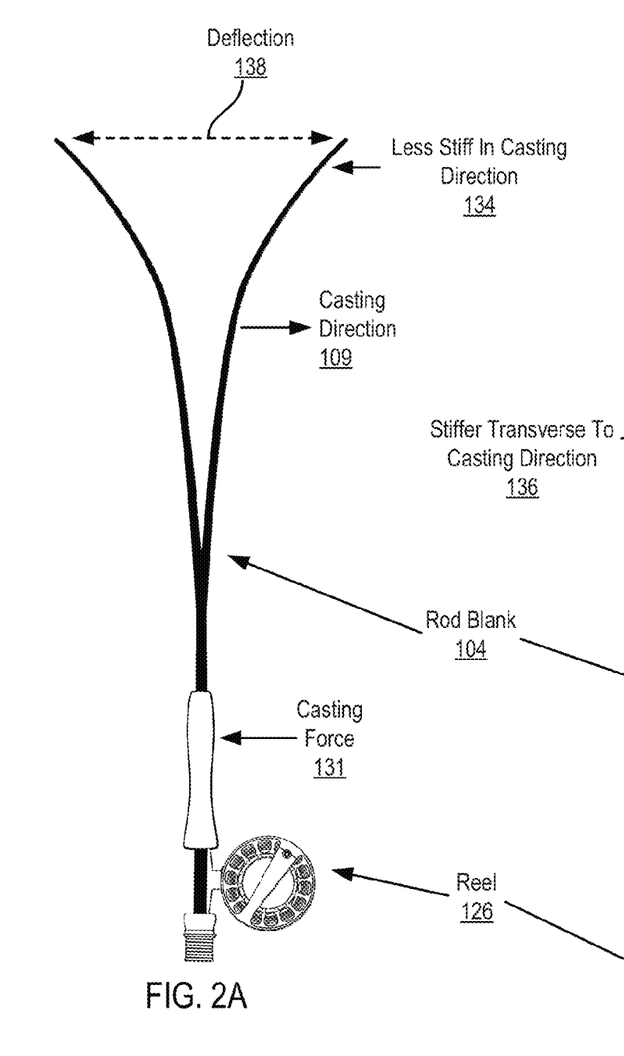
FIGS. 2A and 2B illustrate deflections in a rod blank
Figure 2B:
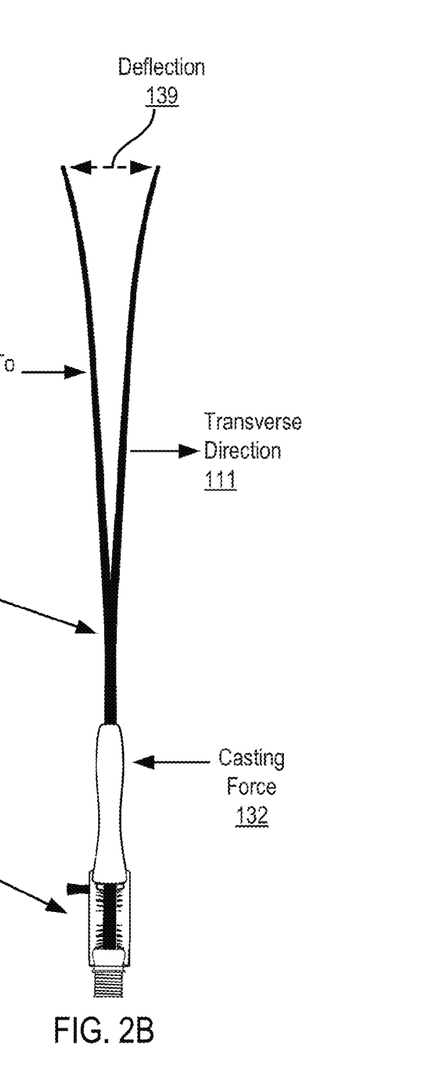

For further explanation of transverse stiffness, FIGS. 2A and 2B illustrate deflections (138) in a rod blank (104) that is stiffer (136) in the transverse direction than in the casting direction (134). The rod blank is subject to a casting force (131) in the casting direction that produces a deflection (138) in the rod blank that is larger than the deflection (139) produced when a casting force (132) of the same magnitude is applied in a direction transverse to the casting direction. Readers will notice that the exact semantics of "casting direction" is a matter of usage and context; it is possible to apply casting force sideways from normal, 'casting' a rod transversely with respect to its normal casting direction. Here, however, "casting direction," depending on context, is generally used to refer to the direction in which an angler would typically apply casting force to a fishing rod to cast a fishing line, generally the direction in which a fishing reel, a handle, or line guides are oriented when mounted on the fishing rod.

Figure 3A:
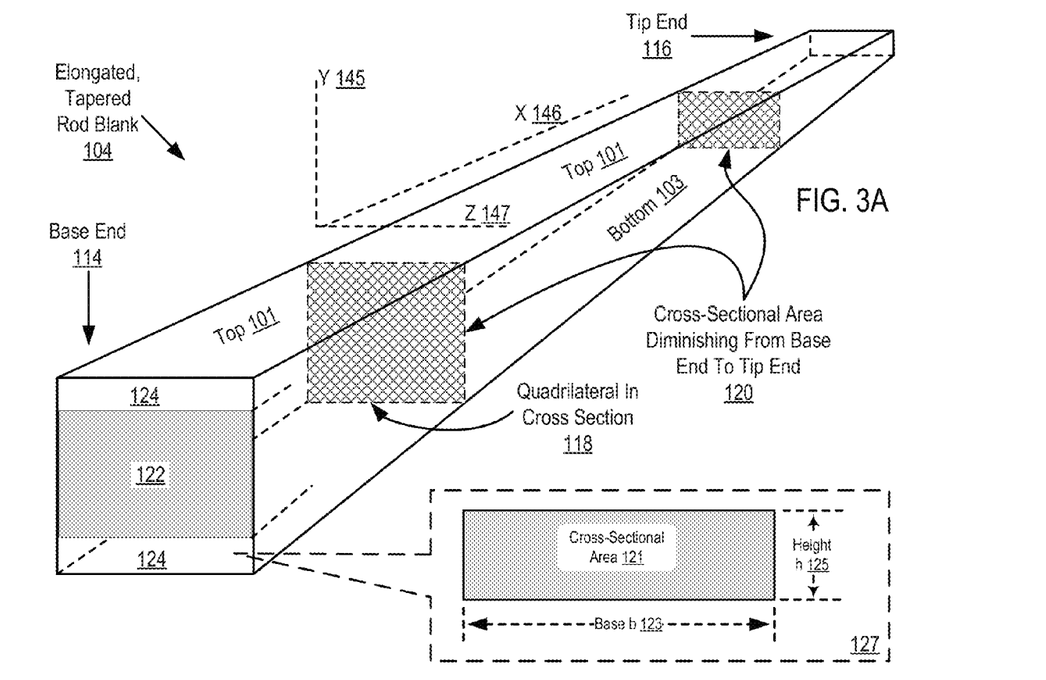
FIGS. 3A-3D set forth perspective view, a top view, and two side views of example rod blanks.
Figure 3B:
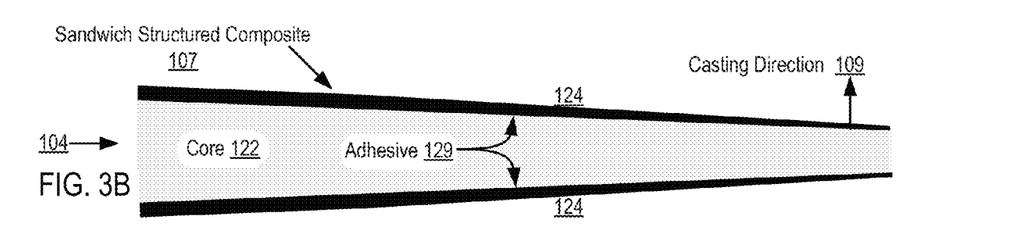

For further explanation, FIGS. 3A and 3B set forth respectively a perspective view and a side view of an example elongated, tapered rod blank (104) according to embodiments of the present invention. The rod blank is elongated, longer along a central axis X (146) than along transverse axes Y (145) and Z (147). The rod blank is a rod in the sense that it is a bar of material that is relatively thin, straight when at rest, but flexible enough to bend in casting a fishing line. The rod blank is quadrilateral in cross section (118) and is tapered through a cross-sectional area (120) that diminishes from the base end (114) of the rod toward the tip end (116).

The rod blank in this example is a sandwich-structured composite of a core (122) disposed between facings (124), with the core less dense than the facings. A 'composite' as the term is used here is a material made from two or more constituent materials with different physical properties. The constituent materials as combined produce a material with characteristics different from the individual components. The constituent components remain distinct within the composite. A sandwich-structured composite is a composite fabricated by attaching two thin but stiff skins or 'facings' to a lightweight but thicker core. The core material in embodiments can be lower strength material, but its higher thickness provides the sandwich composite with high bending stiffness and overall low density.

In rod blanks according to embodiments of the present invention, the constituent materials are facing materials and a less dense core that, when combined into a composite, enable design and construction of a rod blank that, by comparison with rods made with traditional materials, is lighter and more controllable in quantity of stiffness and direction of stiffness. The facings can, for example, be composed of thermoplastic or fiber reinforced plastic. Examples of thermoplastics that, among embodiments, can be used to form facings include poly(methyl methacrylate), polyamides including nylon, polybenzimidazole, polyethylene, polypropylene, polystyrene, polyvinyl chloride, fluoropolymers including polytetrafluoroethylene, and the like. A fiber-reinforced plastic is a composite material made of a polymer matrix reinforced with fibers. The polymer can be an epoxy, vinylester, polyester, or the like. The fibers can be glass, carbon, basalt or aramid, and can include natural fibers such as paper, wood, bamboo, cork, asbestos, and others as will occur to those of skill in the art. The core can be composed of many flexible materials less dense than the facing materials, including, for example, a composite with natural or synthetic fibers composed with thermoplastic or epoxy matrix including cork or bamboo in epoxy, as well as closed-cell foam, a reticulated foam, an open-cell foam such as foam rubber, a syntactic foam, a polyurethane foam, a polyvinyl chloride foam, Styrofoam™, a polyimide foam, a silicone foam, or other flexible synthetic foams as will occur to those of skill in the art.

For ease of explanation, FIGS. 3A and 3B illustrate rod blanks composed entirely of sandwich-structured composite, but that is only for explanation of the structure, not a limitation. Rod blanks according to embodiments of the present invention are correctly described as 'including' or 'comprising' a sandwich-structured composite, but there is nothing in this description that requires a rod blank to be constructed entirely of sandwich-structured composite. It is perfectly within the scope of the present invention to construct, for example, a butt section of a rod blank with a sandwich-structured composite and the tip of the same rod blank of facing material laminated with no core. It is perfectly within the scope of the present invention to construct, for example, a butt section of a rod blank with a sandwich-structured composite and the tip of the same rod blank of graphite or boron circular in cross section. And so on, as will occur to those of skill in the art.

Rod blanks according to embodiments of the present invention are correctly described with at least a portion of the rod blank quadrilateral in cross section, but, again, this is for explanation, not limitation. There is nothing in the present description that requires a rod blank to be constructed entirely quadrilateral in cross section. It is perfectly within the scope of the present invention to construct, for example, a butt section of a rod blank quadrilateral in cross section with a tip that is round in cross section. It is perfectly within the scope of the present invention to construct, for example, a butt section of a rod blank quadrilateral in cross section with a mid-section hexagonal in cross section and a tip that is round in cross section. And so on, as will occur to those of skill in the art.

The facings (124) are generally quadrilateral in cross section with a cross-sectional width or base 'b' (123) that is larger than a cross-sectional height 'h' (125). The area (121) of each cross section of the rod blank along the rod in direction x therefore is a product of the base width and the height of the rod blank at each position x along the rod blank. The cross-sectional area of the rod blank is a function of the position x of a cross section along the rod blank, diminishing as x gets larger.

Figure 3C:
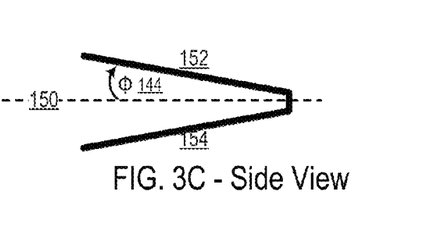
Figure 3D:
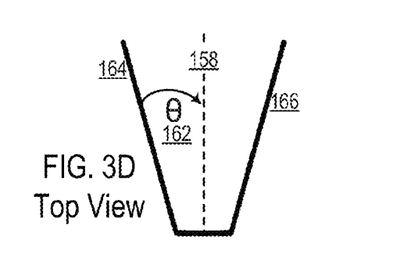

The rod blank is less stiff in a casting direction than transverse to the casting direction. Here the casting direction is indicated by the Y axis (145) with the top and bottom of the rod blank lying in planes parallel to the Z axis (147); it is an axis of the rod that at rest lies in the plane of the X axis that bends when a casting force is applied to the rod blank. For explanation of stiffness, FIG. 3C sets forth a side view of an example facing with top (152) and bottom (154) disposed with respect to a central plane (150) according to angle θ (144). FIG. 3D shows a top view of the same example facing with sides (164, 166) disposed with respect to a central plane (158) according to angle φ (162). Area moments of inertia $I_y$ and $I_z$ as functions of x, θ, and φ, for a facing of length L, in the casting direction Y and in the transverse direction Z are given respectively by equations (1) and (2):

$$I_y(x) = \frac{b(x)h^3(x)}{12} = \frac{4}{3}(L-x)^4 \tan\theta\tan^3\varphi \quad (1)$$

$$I_z(x) = \frac{b^3(x)h(x)}{12} = \frac{4}{3}(L-x)^4 \tan^3\theta\tan\varphi \quad (2)$$

Representing the modulus of inertia of the facing material as $E_f$, the stiffness of the facing S as a function of x is given by:

$$S_y = E_f I_y(x) = E_f \frac{b(x)h^3(x)}{12} = \frac{4}{3}E_f(L-x)^4 \tan\theta\tan^3\varphi \quad (3)$$

$$S_z = E_f I_z(x) = E_f \frac{b^3(x)h(x)}{12} = \frac{4}{3}E_f(L-x)^4 \tan^3\theta\tan\varphi \quad (4)$$

This shows that stiffness in the transverse direction grows with the cube of the base width and only linearly with height, while the reverse is true for the casting direction. So long as the base is wider than the height, this kind of example facing contributes more stiffness transversely than in the casting direction. Readers will recognize from this explanation that such an example rod blank, with facings having bases wider than their heights, can be stiffer transversely than in the casting direction even in portions of the rod blank where the overall cross section is square.

Figure 4A:
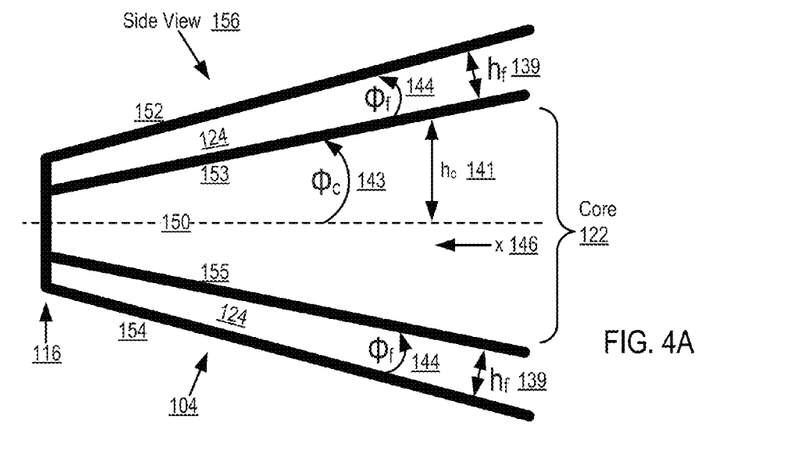
FIG. 4A sets forth a cutaway side view of a tip and front section of a rod blank.
Figures 4B, 4C:
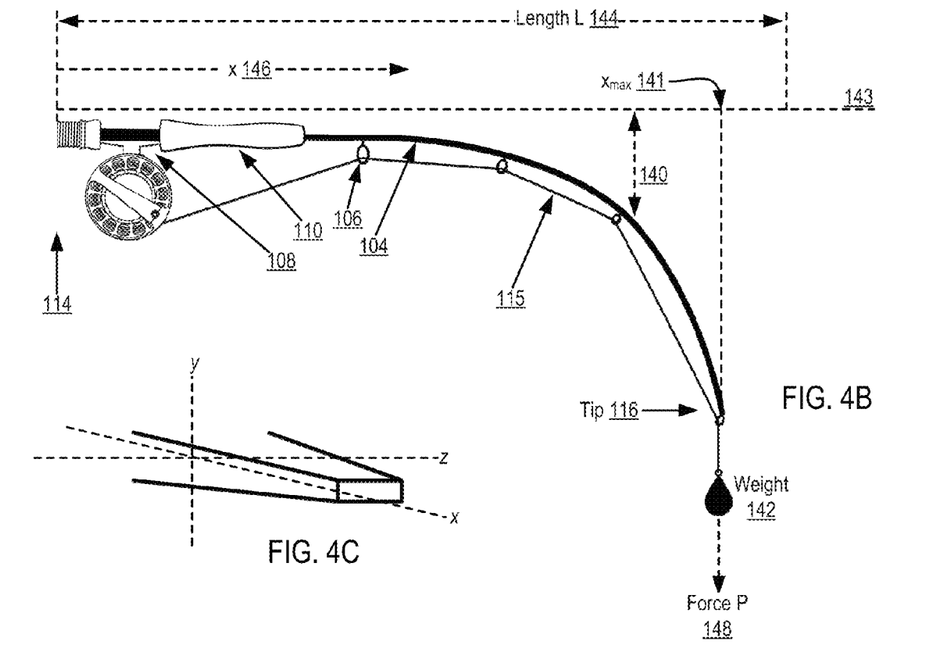
FIG. 4B is a side-view depiction of the deflection of the rod blank under a static load.
FIG. 4C illustrates the coordinate system used to describe the example rod blanks.

For further explanation, FIG. 4A sets forth a cutaway side view (156) of a tip (116) and front section of a rod blank (104). The corresponding top view is set forth in FIG. 3D. The following description of this example rod blank is presented with reference both to FIGS. 4A and 3D, as well as FIGS. 4B and 4C. FIG. 4B is a side-view depiction of the deflection of the rod blank (104) under a static load, and FIG. 4C illustrates the coordinate system used to describe these example rod blanks, with the Y axis in the casting direction, the Z axis transverse, and the X axis parallel to the longitudinal center of the rod blank. X values (146) originate at the base (114) of the rod blank and increase toward the tip (106).

The example rod blank (104) of FIG. 4A diminishes in cross-sectional area from its base toward its tip, and the rod blank is composed of a sandwich-structured composite of a core (122) disposed between facings (124). The core is a foundation structure upon which facings are fashioned to provide characteristic stiffness of a fishing rod. The core, less dense than the facings, provides that structure while adding less weight to the rod overall than would be added by similar structure composed entirely of the denser facing material. With facings having cross sections with base widths larger than heights, the rod blank is less stiff in a casting direction than transverse to the casting direction.

In embodiments, example rod blanks constructed as described here can be characterized under static load in the casting direction by:

$$y = \frac{3P\cot^3\theta\cos\varphi_c\cos\varphi_f}{8(E_c\sin\varphi_c\cos\varphi_f + 2E_f\cos\varphi_c\sin\varphi_f)}\left(\frac{x}{L(L-x)}\right) \quad (5)$$

and transverse to the casting direction by:

$$z = \frac{3P\cot\theta}{8(E_c\tan^3\varphi_c + 2E_f\tan^3\varphi_f)}\left(\frac{x}{L(L-x)}\right) \quad (6)$$

In equations (5) and (6), y is the deflection (140) in the casting direction of a point on the rod blank with respect to a point x (146) on a central axis (143), and z is the deflection transverse to the casting direction of a point on the rod blank with respect to a point x (146) on the central axis (143). L (144) is the length of the rod blank, both when the rod blank is extended straight along the X axis (143) and when the rod blank is curved. P is a force (148) applied by a load weight (142) at the tip end of the rod. θ (162) is an angle between a vertical center plane (158) of the rod blank and each side (164,166) of the rod blank. $\varphi_c$ (143) is an angle between a horizontal center plane (150) of the rod blank and the top (153) and bottom (155) of the core (122). And $\phi_f$ is an angle between the top (153) and bottom (155) of the core (122) and the outer surfaces (152, 154) of the facings (124).

In embodiments, example rod blanks constructed as described here can be characterized under dynamic load in the casting direction by:

$$y = e^{-\beta t}\cos(\omega t)\frac{3P\cot^3\theta\cos\varphi_c\cos\varphi_f}{8(E_c\sin\varphi_c\cos\varphi_f + 2E_f\cos\varphi_c\sin\varphi_f)}\left(\frac{x}{L(L-x)}\right), \quad (7)$$

for $x < x_{max} < L$
and transverse to the casting direction by:

$$z = e^{-\beta t}\cos(\omega t)\frac{3P\cot\theta}{8(E_c\tan^3\varphi_c + 2E_f\tan^3\varphi_f)}\left(\frac{x}{L(L-x)}\right), \quad (8)$$

for $x < x_{max} < L$

In equations (7) and (8), the characteristics x, y, z, L, P, θ, $\phi_c$, and $\phi_f$ are as described above with reference to equations (5) and (6). $x_{max}$ (144) is a point on the central axis (143) corresponding to a position of the rod tip (116) along the curvature of the rod blank while the rod is bending. $x_{max}$ moves back and forth on the x axis as the rod tip moves when in motion resulting from application of a casting force. x is described as less than $x_{max}$ because no deflection is pertinent beyond the position of the tip of the rod blank when bent. x is described as less than L because of apparent singularities in the values of y and z when x equals L. β is a damping coefficient, t is time, ω is damped frequency or ringing frequency for the fundamental mode of harmonic oscillation of the rod blank. Higher nodes or harmonics of oscillation are possible for the rod blank, but for casting of a fishing rod, it is the fundamental mode that is of interest. $E_c$ is a modulus of elasticity of the core, and $E_f$ is a modulus of elasticity of the facings.

Figure 5A:
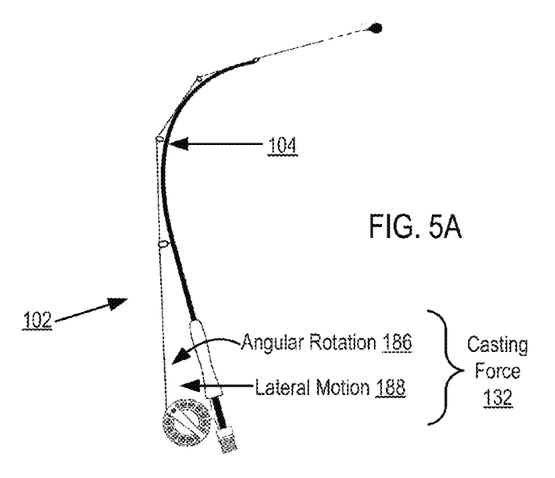
FIG. 5A illustrates the application of a casting force to a fishing rod.
Figure 5B:
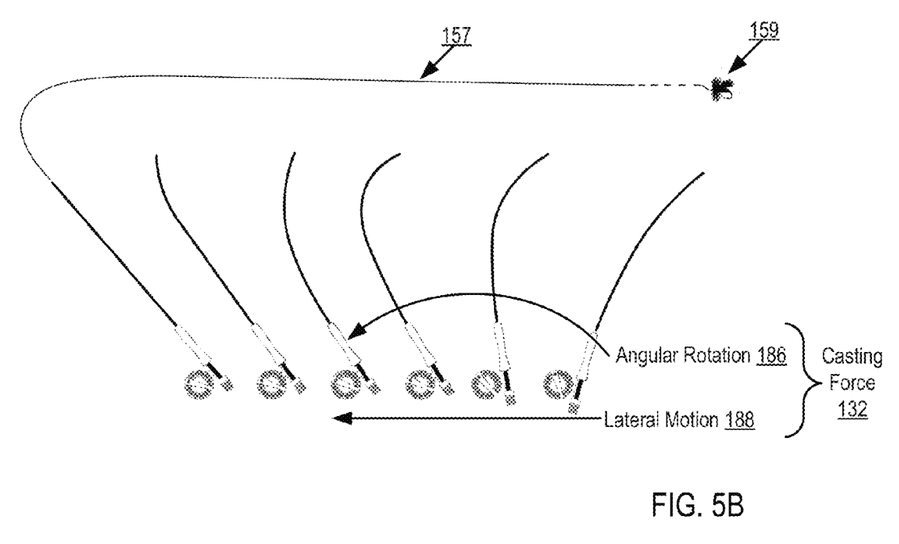
FIG. 5B illustrates a casting force applied to a fly and fly line.

Equation (6) describes oscillatory motion of the rod blank when subjected to a casting force. In the example of FIG. 4B, the weight (142) connected to the rod blank through fishing line (115) can be, for example, a fly fishing fly, a spincasting lure, or the like, and a casting force is then taken as the force required to be applied to the handle (110) to accelerate the weight to a speed that would result in a cast of the weight, a fly or lure, to a particular location, intentionally near to a fish. FIG. 5A illustrates the application of a casting force (132) to a fishing rod (102) and rod blank (104), where the casting force (132) is composed of both an angular rotation (186) and a lateral motion (188). Similarly, FIG. 5B illustrates a casting force (132) composed of angular rotation (186) and lateral motion (188) applied to a fly (159) and fly line (157), where the total magnitude of the casting force is that required to accelerate the weight of the fly and the fly line.

Figure 6A:
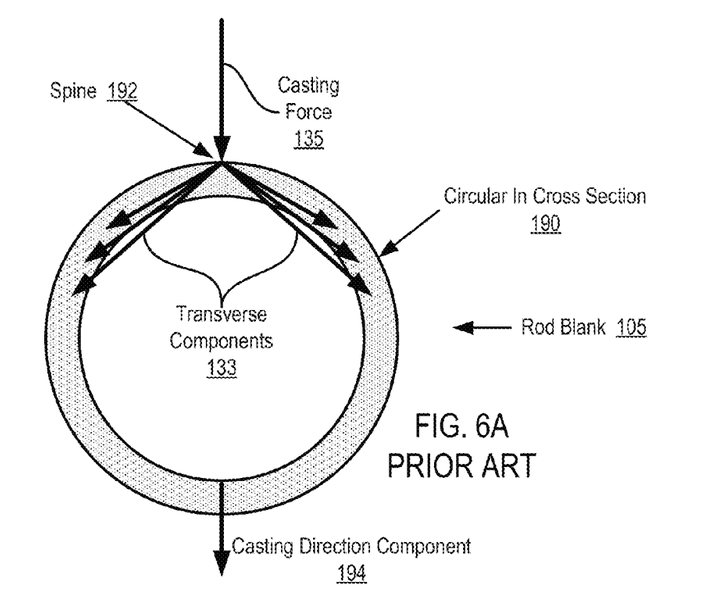
FIGS. 6A and 6B illustrate alternative examples of applications of casting force.
Figure 6B:
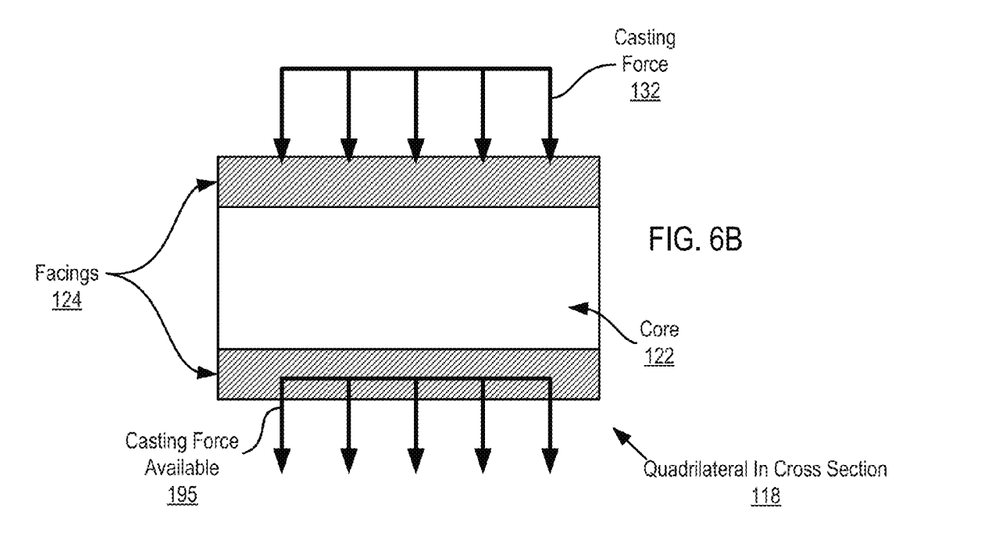

For further explanation, FIGS. 6A and 6B illustrate alternative examples of applications of casting force. In FIG. 6A, a casting force (135) is applied in a casting direction to a round rod blank (105), that is, a rod blank that is circular in cross section (190). The example rod blank (190) has a spine, a line up the rod blank along which the rod blank is slightly less stiff than along other lines. In the example of FIG. 6A, the casting force (135) is applied along the spine, and the rounded structure of the rod blank itself separates the casting force into one component (194) that continues to apply in the casting direction, as well as additional, smaller transverse components (133), that is, force components pointing in directions other than the casting direction. The transverse components are dissipative in nature; they represent damping forces rather than casting force as such. The transverse components represent expenditures of energy that reduce the energy available from the original casting force for actual application in a cast of a fishing line or lure.

In contrast, FIG. 6B illustrates the application of a casting force (132) in a casting direction to a rectangular rod blank, that is, a rod blank that is quadrilateral in cross section. The example rod blank in FIG. 6B has no spine as such, although it is stiffer transversely than in the casting direction because it is composed of a less dense core upon which are disposed top and bottom denser facings, and the facings are rectangular in cross section with bases wider than the heights of the facings. In the example of FIG. 6B, the casting force is applied evenly across the top of the rod blank with little or no redirection of casting force into transverse components. Both rods in FIGS. 6A and 6B will experience damping from internal stresses inherent in the materials of which the rod blanks are made, but the rod blank in the example of FIG. 6B will experience little or no additional damping from transverse components of casting force. Except for damping from internal stresses inherent in the materials of which the rod blank is made, all casting force (132) applied to the example rod blank in FIG. 6B remains available (195) to provide kinetic energy to a cast fishing line and lure. Given applications of exactly the same initial casting force to both rod blanks in FIGS. 6A and 6B, the example rod blank in FIG. 6B will more efficiently convert the energy delivered by the casting force into kinetic energy for casting a fishing line and lure.

Figure 7A:
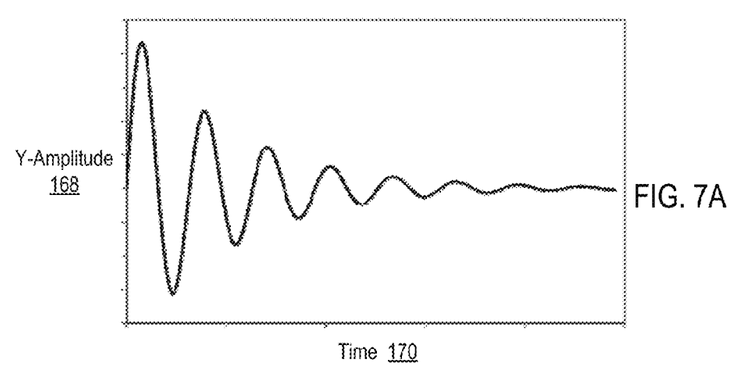
FIGS. 7A-7D set forth plots of harmonic motion of example rod blanks.
Figure 7B:
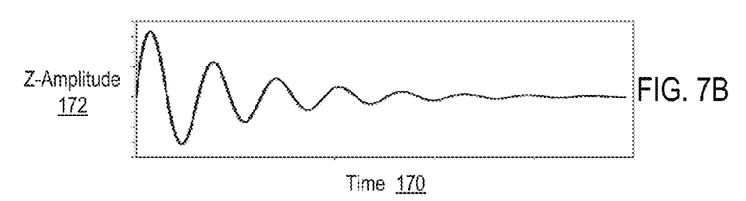

For further explanation of rod blank stiffness, FIGS. 7A and 7B set forth plots of several cycles of a fundamental mode of damped harmonic motion of the tip of a rod blank subjected to a single step of casting force and then allowed to ring, swing back and forth while the oscillations damp. The motion of the tip is selected as illustrative. Similar plots scaled a bit differently would result from consideration of any point on the rod blank in dynamic casting motion. FIG. 7A shows motion of the rod tip in the Y axis viewed from the side. FIG. 7B shows motion of the rod tip in the Z axis viewed from above or below. The axes are those shown in FIG. 4C, so the Y axis is the casting direction. The plots in FIGS. 7A and 7B are from a rod blank constructed as shown in FIG. 6B, with less stiffness and therefore a larger amplitude of harmonic motion in the Y direction. In similar plots of the motion of the tip of the rod blank from the example of FIG. 6A, both plots would quickly asymptote to about the same amplitude.

Figures 7C, 7D:
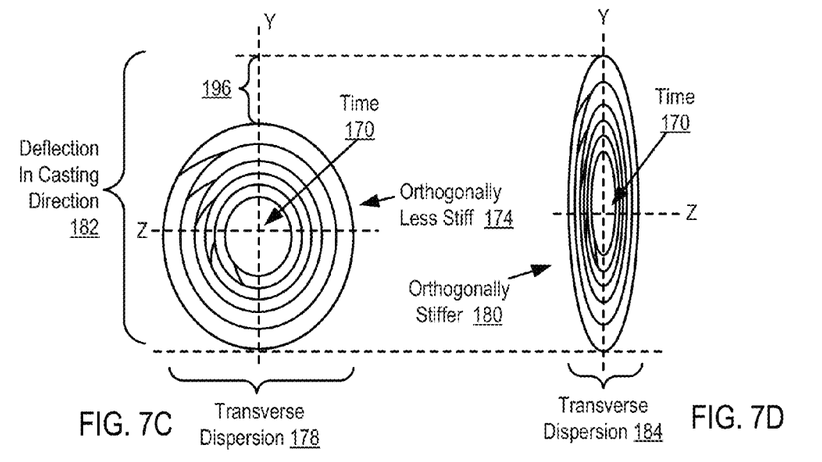

For further explanation of rod blank stiffness, FIGS. 7C and 7D also set forth plots of several cycles of a fundamental mode of damped harmonic motion of the tip of a rod blank subjected to a single step of casting force and then allowed to ring, swing back and forth while the oscillations damp. The axes are those shown in FIG. 4C, so the Y axis is the casting direction. The motion depicted is in the YZ plane looking at the tip of rob blank from the front, back down the X axis toward the base of the rod blank. In both cases, the motion spirals down in time (170) toward the origin of the YZ coordinates, the tip position when the rod blank is at rest. FIG. 7C illustrates tip motion for a rod blank like the one modeled in FIG. 6A. For such a rod blank, the first oscillation after casting force is applied will show motion substantially along the Y axis, but the motion will quickly become elliptical, or, as shown here, very nearly circular, due to substantial, unbalanced transverse components (133 on FIG. 6A) of the casting force promulgated by the structure of the rod blank itself. This is a little surprising, but anyone can confirm this with a simple experiment. Pick up a fishing rod in a sporting goods store, hold the handle firmly against a counter, pull and release the rod blank, and watch the tip. The tip will move in damped harmonic motion with the first cycle in the direction of the pull and subsequent cycles quickly becoming elliptical or, very commonly depending on the particular rod, circular. This demonstrates the presence of transverse force components, very apparent on subsequent cycles of harmonic motion, but present even in the first motion of a cast.

The plot in FIG. 7D is from a rod blank constructed as shown in FIG. 6B, with less stiffness and therefore a larger amplitude of harmonic motion in the Y direction. The plots of FIGS. 7C and 7D result from application of the same casting force to two example rods, and the difference in deflection in the casting direction is illustrated at reference (196). By comparison with FIG. 6C, it is clear also that transverse dispersion (178, 184) is much smaller for the rod blank in motion according to the plot in FIG. 7D. Disparity from casting to transverse stiffness may vary. In the example of FIG. 7D, there is sufficient disparity to pattern a narrow ellipse. In at least some rod blanks according to embodiments of the present invention, transverse stiffness is sufficient to convert a plot like the one in FIG. 7D practically to a straight vertical line. Fishing lines and lures cast with a fishing rod built from such a rod blank will track accurately. For fishing applications where accurate casting is important, a fishing rod built from such a rod blank will cast accurately.

Rod blank stiffness is a function of area moment of inertia which in turn is a function of rod blank taper. Some examples in this paper vary taper and therefore stiffness by varying cross-sectional area linearly with respect to angles defining it, $\theta$ horizontally and $\phi$ vertically, where $\theta$ and $\phi$ are non-zero constants. When $\theta$ and $\phi$ are constants, the top, bottom, and sides of a rod blank are straight; they are angled with respect to one another so that the rod blank tapers, but the exterior surfaces implementing the taper are straight. There is, however, no requirement within the scope of the present invention that the angles defining taper of a rod blank must have constant values. In at least some embodiments, the angles defining taper vary according to displacement along a rod blank, that is, evaluating displacement along the rod blank a the x value on a coordinate such as the one illustrated at reference (143) on FIG. 4B, $\theta$ and $\phi$ can be functions of x such that $\theta=\theta(x)$ and $\phi=\phi(x)$.

Figure 8A:
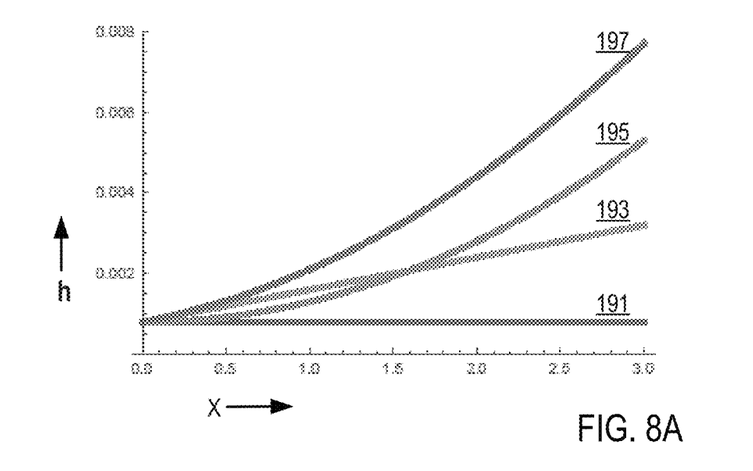
FIG. 8A sets forth plots of facing height as a function of displacement along a rod blank for a facing structured as illustrated in FIG. 8B.
Figure 8B:
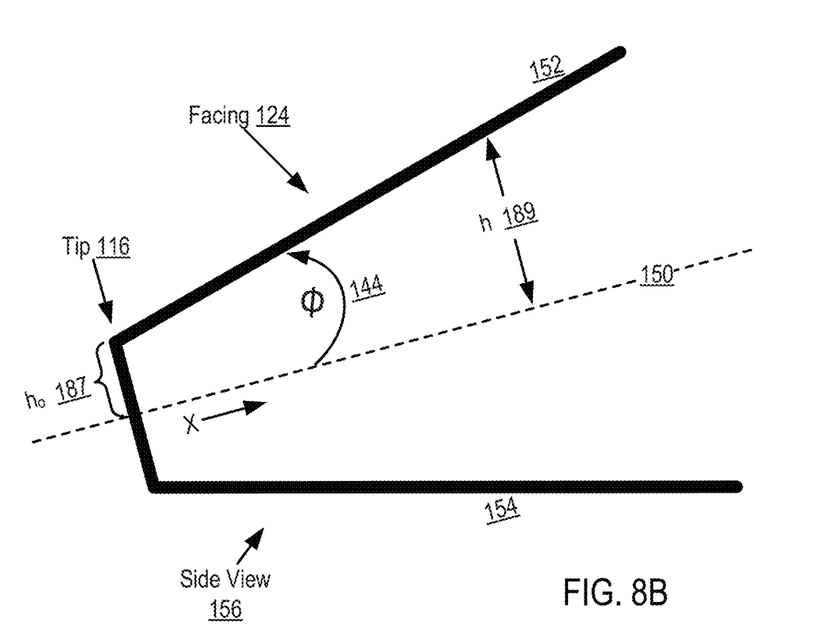

For further explanation, FIG. 8A sets forth a graph of several example plots of facing height as a function of displacement along a rod blank for a facing (124) structured as illustrated in FIG. 8B. The example rod blank is oriented with a central x axis (150) on which x is set to zero at the tip (116) and increases in value toward the base of what is taken as a facing 3 meters in length; the coordinates of FIG. 8B are measured in meters, and the plots are of height h on the vertical axis and x on the horizontal axis. Height h (189) is one-half the thickness of the facing at point x, the distance from the central axis (150) to the top (152) of the facing (124). The beginning height is designated $h_0$ (187), one-half the thickness of the facing (124) at its tip (116). For the plots graphed here, the value of h0 is set to 0.8 mm for a tip thickness of 1.6 mm, a thickness typical of actual fishing rods. $\phi$ (144) is the angle formed by the top (152) of the facing and the central axis (150); in effect, $\phi$ is the slope of the top with respect to the axis. $\phi$ in this discussion will be varied as a function of x. Of course $\theta$ also can vary as a function of x, although for ease of explanation in this discussion, $\theta$, disposed as shown in FIG. 3D, remains a constant.

Plot (191) is for $h=h_0$, $\Phi=0$, giving a straight reference line at the beginning height of 0.0008 meters or 0.8 mm. Plot (193) is for a constant $\phi$ equal to 0.0008 radians or about 0.05 degrees. That is, plot (193) graphs $h=h_0+x(\tan \phi_0)$, where $\phi_0$ has a constant value of 0.0008, and the plot of h is therefore a straight line.

Plot (195) is for $\phi$ as a function of x, $\phi=0.0005(x)$. That is, plot (195) graphs $h=h_0+x(\tan(0.0005(x)))$. Now the shape of the top of the facing is curved rather than straight. From x=0 until about half way down the facing, where x is about 1.5 or 1.6, the height h is smaller than the corresponding height of the facing depicted in plot (193) and afterwards larger proceeding toward the base of the facing. A rod blank constructed with a facing according to plot (195), by comparison with a rod blank built with a facing according to plot (193), all other things being equal, would be in the casting direction more flexible in the front half of the rod blank nearer the tip and stiffer in the back half of the rod blank toward the base.

Plot (197) is for $\phi$ as a function of x, $\phi=\phi_0+0.0005(x)$. That is, plot (197) graphs $h=h_0+x(\tan(\phi_0+0.0005(x)))$, with $\phi_0$ set equal to 0.0008 radians. Again the shape of the top of the facing is curved rather than straight. This time, however, h is larger than the corresponding height of the facing depicted in plot (193), not just in the front half, but throughout the entire length of the facing. A rod blank constructed with a facing according to plot (197), by comparison with a rod blank built with a facing according to plot (193), all other things being equal, would be stiffer in the casting direction throughout the entire length of the rod blank.

Figure 9:
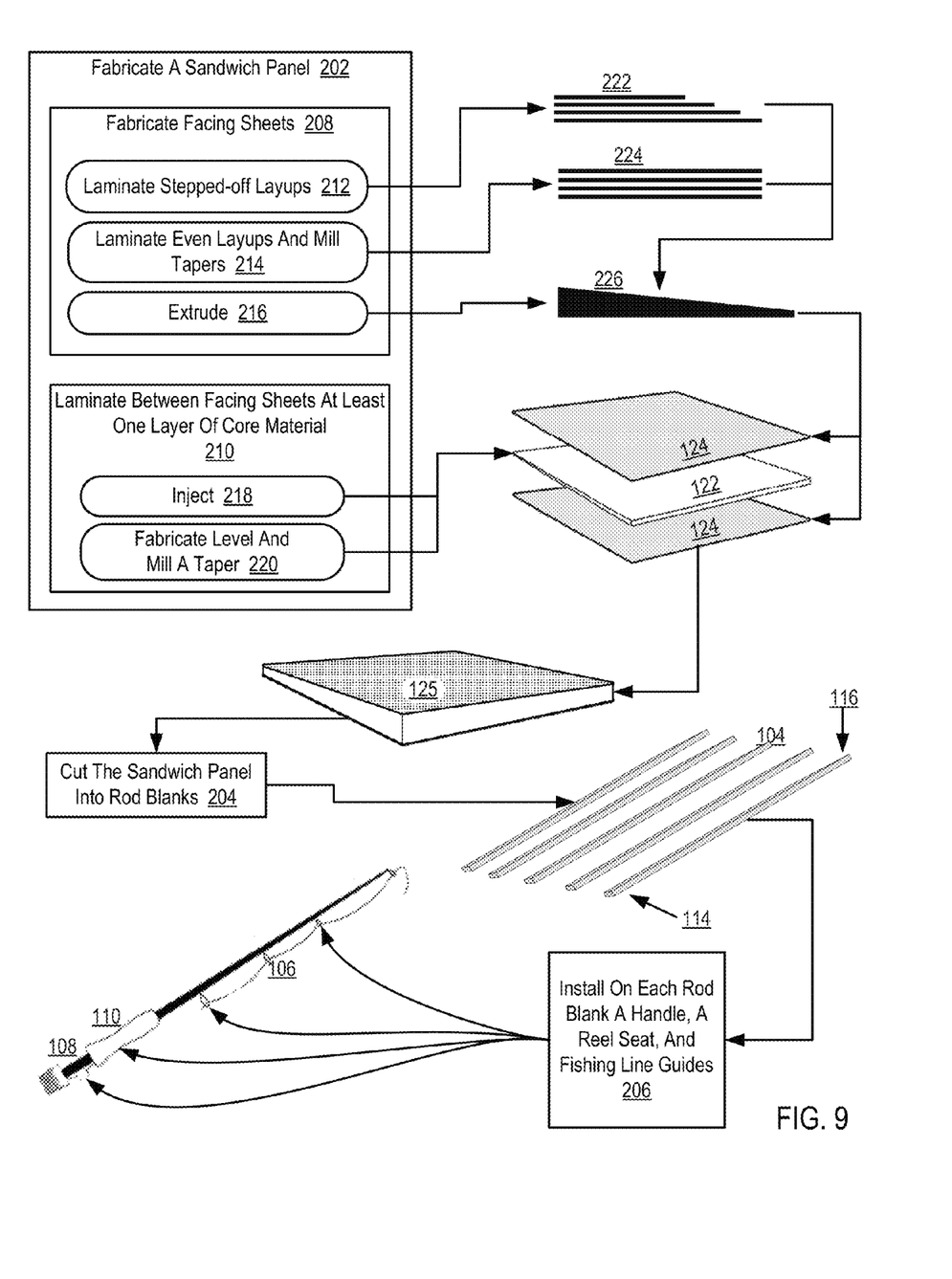
FIG. 9 sets forth a flow chart illustrating example methods of manufacturing a fishing rod.

For further explanation, FIG. 9 sets forth a flow chart illustrating example methods of manufacturing a fishing rod according to embodiments of the present invention that includes fabricating (202) a sandwich panel (125), cutting (204) the sandwich panel into rod blanks (104), and installing (206) on each rod blank a handle (110), a reel seat (108), and fishing line guides (106). In embodiments, manufacturing a fishing rod includes wrapping each rod blank in a scrim of fiber reinforced plastic before installing handle, seat, and fishing line guides. In embodiments, manufacturing a fishing rod includes wrapping each rod blank in a film layer of thermoplastic polymer resin such as, for example, polyethylene terephthalate or 'PET' before installing handle, seat, and fishing line guides. In embodiments, manufacturing a fishing rod includes coating each rod blank in synthetic resin before installing handle, seat, and guides. In the example of FIG. 9, each rod blank (104) is an elongated, tapered rod blank quadrilateral in cross section and diminishing in cross-sectional area from a base end (114) of the rod blank to a tip end of the rod blank (116) As in FIG. 3B, each rod blank is composed at least in part of a sandwich-structured composite (107) of a core (122) disposed between facings (124), the core less dense than the facings, the rod blank less stiff in a casting direction (109) than transverse to the casting direction. In at least some embodiments, the core is bonded to the facings with an adhesive (129 on FIG. 3B).

In the example of FIG. 9, fabricating (202) a sandwich panel includes fabricating (208) facing sheets (124) and laminating (210) between facing sheets at least one layer of core material (122). The example method of FIG. 9 includes three alternative ways of fabricating (108) facing sheets (124). In the example of FIG. 9, fabricating facing sheets can be carried out by laminating (212) plastic facing sheets in stepped off layups (222), curing them into a final form of facing sheet (226), and fabricating that final form of facing sheet into a sandwich-structure composite (226, 124). Fabricating facing sheets alternatively can be carried out by laminating (214) plastic facing sheets in even layups (224), curing them, and then milling them into a final form of facing sheet (226), and fabricating that final form of facing sheet into a sandwich-structure composite (226, 124). As a further alternative, fabricating facing sheets can be carried out by extruding (216) plastic directly into a final form of facing sheet (226) and fabricating that final form of facing sheet into a sandwich-structure composite (226, 124). Fabricating rod blanks according to embodiments of the present invention greatly facilitates the development and manufacture of rod blanks quadrilateral in cross section characterized by linear tapers as well as more complex non-linear tapers. In view of this explanation, readers of skill in the art will recognize that building rod blanks with sandwich-structured composites amenable to larger-scale layouts, milling, and extrusion results in much more efficient construction methodologies than the traditional industry-standard flag-shaped sheets of prepreg wrapped onto mandrels.

The example method of FIG. 9 includes two alternative ways of laminating (210) between facing sheets at least one layer of core material (122). In the example of FIG. 9, laminating (210) between facing sheets at least one layer of core material (122) can be carried out by injecting (218) a layer of core foam between two facing sheets. Alternatively in the example of FIG. 9, laminating (210) core material between facing sheets can be carried out by fabricating (220) a level sheet of core material (122) and milling the level core material into a taper.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of manufacturing a fishing rod, the method comprising:
    fabricating a sandwich panel, including fabricating at least two facing sheets and laminating between the facing sheets at least one layer of core material, the core material characterized by less density than the facing sheets;
    cutting the sandwich panel into one or more rod blanks, each cut generally parallel to a central axis of a rod blank, each rod blank elongated, tapered, and at least partly quadrilateral in cross section, the quadrilateral portion of each rod blank diminishing in cross-sectional area toward a tip end of the rod blank, the quadrilateral portion of each rod blank less stiff in a casting direction than transverse to the casting direction; and
    installing on each rod blank a handle, a reel seat, and fishing line guides.

2. The method of claim 1 wherein the facing sheets comprise fiber reinforced plastic.

3. The method of claim 1 wherein the facing sheets comprise natural fiber impregnated with polymer.

4. The method of claim 1 wherein the facing sheets comprise a thermoplastic.

5. The method of claim 1 wherein fabricating facing sheets further comprises extruding plastic into facing sheets.

6. The method of claim 1 wherein fabricating facing sheets further comprises laminating plastic facing sheets in stepped off layups.

7. The method of claim 1 wherein fabricating facing sheets further comprises laminating plastic facing sheets in even layups and milling the facing sheets into paper.

8. The method of claim 1 wherein laminating core material further comprises injecting a layer of core foam between two facing sheets.

9. The mthod of claim 1 wherein laminating core material further comprises fabricating a level sheet of core material and milling the level core material into a taper.

10. The method of claim 1 with the quadrilateral portion of the rod blank characterized under static load in the casting direction by:

$$y = \frac{3P\cot^3\theta\cos\varphi_c\cos\varphi_f}{8(E_c\sin\varphi_c\cos\varphi_f + 2E_f\cos\varphi_c\sin\varphi_f)}\left(\frac{x}{L(L-x)}\right),$$

where:
    y is deflection of a point on the rod blank with respect to a point x on a central axis,
    L is the length of the rod blank,
    P is a force applied by a load weight at the tip end of the rod,
    θ is an angle between a vertical center plane of the rod blank and each side of the rod blank,
    $\phi_c$ is an angle between a horizontal center plane of the rod blank and the top and bottom of the core,
    $\phi_f$ is an angle between the top and bottom of the core and the outer surfaces of facings of the rod blank,
    $E_c$ is a modulus of elasticity of the core, and
    $E_f$ is a modulus of elasticity of the facings.

11. The method of claim 1 with the quadrilateral portion of the rod blank characterized under static load transverse to the casting direction by:

$$-z = \frac{3P\cot\theta}{8(E_c\tan^3\varphi_c + 2E_f\tan^3\varphi_f)}\left(\frac{x}{L(L-x)}\right),$$

where:
    z is deflection of a point on the rod blank with respect to a point x on a central axis,
    L is the length of the rod blank,
    P is a force applied by a load weight at the tip end of the rod,
    θ is an angle between a vertical center plane of the rod blank and each side of the rod blank,
    $\phi_c$ is an angle between a horizontal center plane of the rod blank and the top and bottom of the core,
    $\phi_f$ is an angle between the top and bottom of the core and the outer surfaces of facings of the rod blank,
    $E_c$ is a modulus of elasticity of the core, and
    $E_f$ is a modulus of elasticity of the facings.

12. The method of claim 1 with the quadrilateral portion of the rod blank characterized in the casting direction under dynamic load by:

$$y = e^{-\beta t}\cos(\omega t)\frac{3P\cot^3\theta\cos\varphi_c\cos\varphi_f}{8(E_c\sin\varphi_c\cos\varphi_f + 2E_f\cos\varphi_c\sin\varphi_f)}\left(\frac{x}{L(L-x)}\right),$$

for $x < x_{max} < L$, where:
    y is deflection of a point on the rod blank with respect to a point x on a central axis,
    L is the length of the rod blank, $x_{max}$ is a point on the central axis corresponding to a position of the rod tip along a curvature of the rod blank, P is a force applied by a load weight at the tip end of the rod, θ is an angle between a vertical center plane of the rod blank and each side of the rod blank, $\phi_c$ is an angle between a horizontal center plane of the rod blank and the top and bottom of the core, $\phi_f$ is an angle between the top and bottom of the core and the outer surfaces of facings of the rod blank, β is a damping coefficient, t is time, ω is damped angular velocity for a fundamental mode of harmonic oscillation for the rod blank, $E_c$ is a modulus of elasticity of the core, and $E_f$ is a modulus of elasticity of the facings.

13. The method of claim 1 with the quadrilateral portion of the rod blank characterized transverse to the casting direction under dynamic load by:

$$z = e^{-\beta t}\cos(\omega t)\frac{3P\cot\theta}{8(E_c\tan^3\varphi_c + 2E_f\tan^3\varphi_f)}\left(\frac{x}{L(L-x)}\right),$$

for $x<x_{max}<L$, where:

z is deflection of a point on the rod blank with respect to a point x on a central axis, L is the length of the rod blank, $x_{max}$ is a point on the central axis corresponding to a position of the rod tip along a curvature of the rod blank, P is a force applied by a load weight at the tip end of the rod, θ is an angle between a vertical center plane of the rod blank and each side of the rod blank, $\phi_c$ is an angle between a horizontal center plane of the rod blank and the top and bottom of the core, $\phi_f$ is an angle between the top and bottom of the core and the outer surfaces of facings of the rod blank, β is a damping coefficient, t is time, ω is damped angular velocity for a fundamental mode of harmonic oscillation for the rod blank, $E_c$ is a modulus of elasticity of the core, and $E_f$ is a modulus of elasticity of the facings.

* * * * *